Nov. 28, 1950 R. A. BRAUNBERGER 2,531,871
FIFTH WHEEL
Filed Dec. 16, 1948 3 Sheets-Sheet 1

INVENTOR.
Ray A. Braunberger
BY Bruno C. Lechler
ATTORNEY

Nov. 28, 1950 R. A. BRAUNBERGER 2,531,871
FIFTH WHEEL

Filed Dec. 16, 1948 3 Sheets-Sheet 2

INVENTOR.
RAY. A. BRAUNBERGER

BY *Bruno Lechler*
ATTORNEY

Patented Nov. 28, 1950

2,531,871

UNITED STATES PATENT OFFICE 2,531,871

FIFTH WHEEL

Ray A. Braunberger, Chicago, Ill.

Application December 16, 1948, Serial No. 65,577

5 Claims. (Cl. 280—33.05)

The invention relates to an improvement in fifth wheels which are attached to the top of a tractor and which support the front end of a semi-trailer.

More specifically, the invention relates to a novel construction of a fifth wheel that provides for transmitting the load from the semi-trailer to the tractor in a manner combining rigidity with a limited degree of flexibility.

The base plate of the fifth wheel is rigidly attached to the chassis of the tractor. The top plate can rotate about the king pin projecting down from the sole plate of the semi-trailer, but otherwise is locked to, and moves with, the semi-trailer.

The construction of this fifth wheel transmits the stresses from the top plate to the base plate through novel rockers and a layer of rubber that permits absorbing jolts by allowing slight relative motion thereby between the top and the bottom plate while definitely limiting the extent of this motion.

Both the top plate and the bottom plate are ribbed castings that provide bearing surfaces and pivot points with a minimum number of assembled parts, thus precluding loss of rigidity due to wear of bolts or rivets.

The base plate comprises an H-shaped casting each end bar of which extends along one side bar of the chassis and which is bolted thereto. The cross bar cast integral with the side bars holds the entire base plate in rigid alignment and prevents the transmission to the chassis of forces tending to distort it.

The top plate, generally circular, has a slot that permits the king pin to find its way to the center of the top plate. The top plate carries locking mechanism of any desired type to prevent the king pin leaving its engaged position. One form of locking mechanism is shown in the application of Ray A. Braunberger filed November 17, 1948, Serial Number 60,575.

The top plate is supported on an axis extending crosswise of the tractor and located below the king pin. This permits the top plate to tilt front to back while transmitting the load of the front end of the semi-trailer, the pull to draw it forward, and the side twist to the base plate. Ears, extending downward from the top plate, are bored for studs located in this horizontal axis. Each stud is supported on a novel rocker having a foot embedded in rubber and located in a housing carried by the base plate. Each rocker can tilt forward, tilt sidewise, or twist slightly. Thus structural inequalities, as well as jolts, are absorbed.

One object of the invention is to provide a rubber jolt-absorbing layer, under compression, located between the load and the chassis.

Another object is to support the top plate on rockers mounted in rubber.

Another object is to support the top plate on the bottom plate in a manner that any uplift is resisted by the compression of a rubber layer.

Another object is to provide a support for the top plate that includes rockers having feet that have curved soles and which are narrower at the end and mounted in stationary shoes that conform generally to the feet with rubber completely encasing the foot in the shoe.

Figure 1:
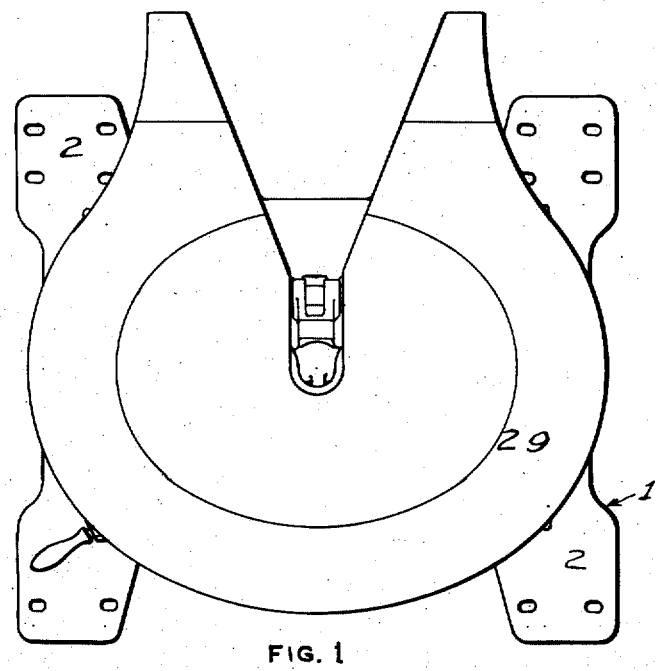
Fig. 1 is a plan view of the invention.
Figure 2:
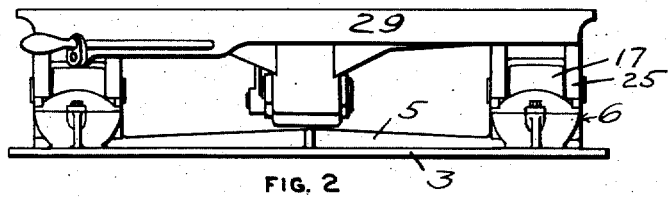
Fig. 2 is an end view of the invention.
Figure 3:
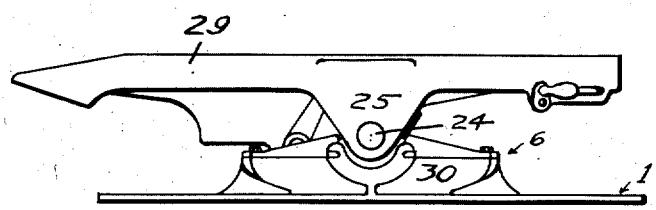
Fig. 3 is a side view of the invention.
Figure 4:
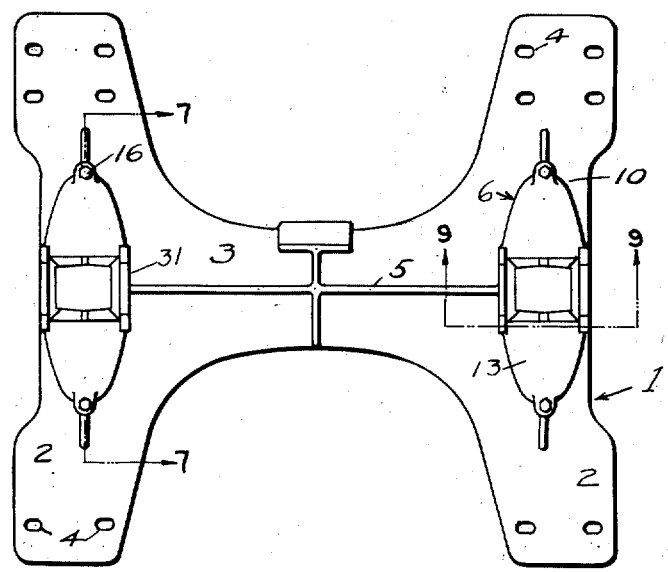
Fig. 4 is a plan view of the base plate with the rockers in place.
Figure 5:
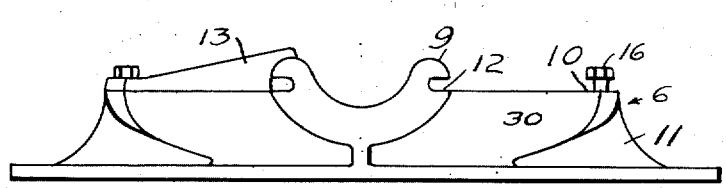
Fig. 5 is a side view of one of the shoes shown in Fig. 4 with one cover removed drawn to an enlarged scale.
Figure 6:
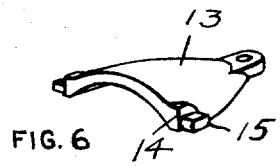
Fig. 6 is a perspective view of a cover.

The base plate is generally indicated by 1. This plate has side pieces 2 that extend longitudinally of the tractor (not shown). These side pieces are united by an integrally cast bar portion 3 extending crosswise. This cross bar is reinforced by ribs 5. Holes 4 provide for convenient attachment to the chassis of the tractor. To base carries two shoes generally indicated at 6.

Each shoe comprises an elongated hollow trough-like part 30, narrower at the ends 10 than near the center 31, and cast integral with the base plate, and two covers 13, each closing one end of the top of the trough. The sides of the trough are extended upward near its center as indicated at 9, and horizontal slots 12 are cast into this vertical extension. Each cover 13 has two vertical surfaces 14 that align the shorter edge of the cover within the sides of the trough and two projecting ears 15 that are adapted to slide horizontally into slots 12. At the narrow end of the plate is a circular hole permitting a single bolt 16 tapped into the shoe to hold the cover down on the trough against movement.

Ribs 11 rise up from the base under the ends of the trough to transmit the load.

Figure 7:
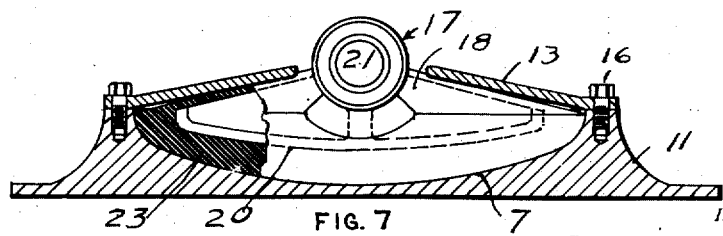
Fig. 7 is a section in elevation along lines 7—7 in Fig. 5.
Figure 8:
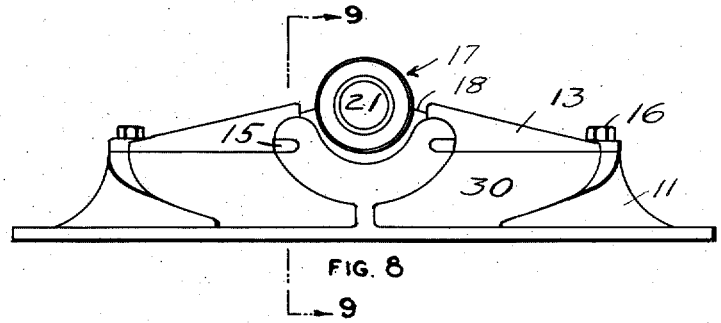
Fig. 8 is an elevation of the shoe with the rocker in place.
Figure 9:
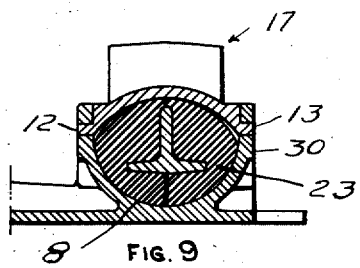
Fig. 9 is a section along line 9—9 in Fig. 4.

The space inside the trough and under the curved covers is concave, free of sharp edges, generally ellipsoid in shape. Thus the curvature of the bottom longitudinally as shown at 7 in Fig. 7 is much flatter than the transverse curvature shown at 8 in Fig. 9.

Figure 10:
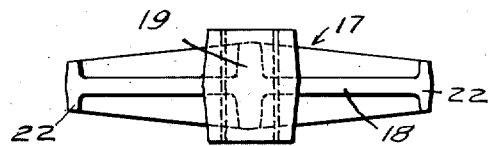
Fig. 10 is a plan view of a rocker.

A rocker generally indicated at 17 has a web 18 which projects from the shoe and a foot encased in the shoe. This rocker is a casting having a cross web 19, a foot having a bottom surface 20 and a bored hole 21. At each end the foot tapers to a toe 22 as shown in Fig. 10.

The foot is smaller than the space inside the shoe. The entire space intervening between shoe and foot is filled by a rubber layer 23 vulcanized to the foot.

Studs 24 pass through bores 21 and ears 25 which extend down from the top plate 29.

When the tractor starts up, the rocker can rock slightly compressing the rubber under the toe of the rocker arm and between the heel of the rocker and the cover plate of the shoe.

If there is a sudden jolt in a crosswise plane, one foot can compress the rubber slightly against the shoe, thus allowing that side of the top plate to descend, while the other foot can compress the rubber against the top covers of the other shoe.

I claim:

1. In a fifth wheel, in combination, an elongated cast trough, raised wall portions on two opposite sides of said trough, horizontal slots in said raised portions, a cover for each end of the trough, one end of each cover being anchored in said slots, the other end anchored to the trough by a single bolt which prevents the cover sliding along the top of the trough out of said slots.

2. In a fifth wheel assembly, in combination, a cast-metal base plate adapted to be mounted on the chassis of a vehicle, a pair of oval basins having concave internal surfaces free of sharp edges integrally cast with said base plate, sectional concave covers adapted to be fastened to said basins, in each basin an elongated shoe of metal of such shape that if placed in the center of said basin the distance between it and the inner surface of the basin and the cover will be comparable at all points, a curved sole plate on the under side of each of said shoes, a vertical rib forming part of each of said shoes and extending up from the sole plate through a slot in the covers, a rubber-like substance filling the space between the shoe and the basin wall, a lower fifth wheel disc supported on the ribs of said two shoes in a manner permitting said disc to tilt.

3. In a fifth wheel assembly of the type in which vertical load and horizontal traction pull are transmitted to a lower fifth wheel plate that is tiltably supported on the upper ends of shoes mounted in rubber in a pocket in a base mounted on a vehicle chassis, in combination, a cast base plate having two parallel basins integrally cast thereon, the inner surfaces of said basins being ellipsoids with a common minor axis; elongated shoes having a curved lower surface generally conforming to the shape of the bottom of the basket in said basins, a vertical rib on each shoe extending above the basin, a resilient rubberlike material filling the remaining space inside of the basins, bores in each vertical rib having a common axis said bores being located less than half the length of the shoe above its sole and midway between the ends of the shoe so that the resultant force transmitted through said bores to the shoe will pass through its sole, a lower fifth wheel plate supported tiltably in said bores.

4. In a fifth wheel assembly designed to transmit both vertical loads and horizontal forces, in combination, an upper fifth wheel disc attached to the underside of a trailer, a king-pin extending downward from the center of said disc, a lower fifth wheel disc supporting the upper fifth wheel disc and taking the horizontal forces transmitted by the king-pin, a horizontal shaft below the lower fifth wheel disc on which said disc is tiltably supported, two metal shoes supporting said shaft each shoe having a convex sole that is part of an arc whose radius is several times that of the distance from the shaft to the bottom of the sole and the length of the shoe being such that the resultant force transmitted by the shaft upon the shoe will pass downward at an angle to the vertical through the sole of the shoe, a support which is curved to conform to the shape of the sole carried by a vehicle, a rubber layer between said supports and shoes.

5. A device transmitting vertical and horizontal loads through a resiliently supported rocker to a base having, in combination, a base having a concave bearing surface, a metal shoe having a long narrow convex sole supported on said resilient layer, a vertical rib extending upward from said sole, means for transferring load to said rib at a point midway between the ends of the shoe and at a distance above said sole less than a third of the length of the shoe so that the resultant of the combined vertical and horizontal forces transmitted to said shoe passes through the sole of the shoe at all times to cause heavier compression of the resilient layer at one end than the other end without creating tension at the other end of the shoe.

RAY A. BRAUNBERGER.

REFERENCES CITED

The following references are of record in the file of this patent:

UNITED STATES PATENTS

| Number | Name | Date |
| --- | --- | --- |
| 2,027,990 | Lubbers | Jan. 14, 1936 |
| 2,289,079 | Seyferth | July 7, 1942 |